United States Patent [19]

Shiota et al.

[11] Patent Number: 5,674,975
[45] Date of Patent: Oct. 7, 1997

[54] PROCESS FOR MANUFACTURING AN IMPROVED ACRYLONITRILE POLYMER MELT

[75] Inventors: Hirotaka Shiota, Okayama; Ryosuke Nishida, Okayama-ken; Takahisa Kida, Okayama; Noriyuki Kohara, Okayama; Yoshihiro Watanabe, Okayama; Ryuichi Kasahara, Okayama, all of Japan

[73] Assignee: Japan Exlan Company Limited, Osaka, Japan

[21] Appl. No.: 636,963

[22] Filed: Apr. 24, 1996

[30] Foreign Application Priority Data

Jul. 28, 1995 [JP] Japan .................. 7-212664

[51] Int. Cl.$^6$ ............................. C08F 6/10
[52] U.S. Cl. ............................. 528/483; 528/500
[58] Field of Search ....................... 528/483, 500

[56] References Cited

U.S. PATENT DOCUMENTS

| | | | |
|---|---|---|---|
| 3,847,885 | 11/1974 | Peeso, Jr. ........................ | 260/85.5 R |
| 3,940,405 | 2/1976 | Serad ........................... | 260/29.6 AN |
| 4,238,441 | 12/1980 | Cramer .......................... | 264/206 |
| 4,461,739 | 7/1984 | Young et al. ..................... | 264/176 F |
| 5,314,990 | 5/1994 | Jansen et al. .................... | 528/500 |

FOREIGN PATENT DOCUMENTS

| | | |
|---|---|---|
| 0223199 | 5/1987 | European Pat. Off. . |
| 0355764 | 2/1990 | European Pat. Off. . |

OTHER PUBLICATIONS

American Cyanamide Co., LU No. 69307, 1974, pp. 38–39 and claims.

Primary Examiner—Thomas R. Weber
Attorney, Agent, or Firm—Wenderoth, Lind & Ponack

[57] ABSTRACT

Saturated or superheated steam, or an inert gas, or a combination thereof is introduced into a gas phase above a molten acrylonitrile polymer in a vessel having a stirrer, while the polymer has a temperature of at least 120° C. and a pressure at least equal to its autogenous pressure. Any unreacted acrylonitrile monomer, or both any such monomer and any acrylonitrile monomer or water used as a plasticizer are removed by evaporation from the vessel.

6 Claims, 3 Drawing Sheets

PROCESS FOR MANUFACTURING AN IMPROVED ACRYLONITRILE POLYMER MELT

BACKGROUND OF THE INVENTION

1. Field of the Invention

This invention relates to a method of removing the remaining monomer from an acrylonitrile polymer melted by plasticization at an elevated temperature and an elevated pressure. More particularly, it relates to a process for manufacturing an acrylonitrile polymer melt containing only a reduced amount of acrylonitrile monomer by removing the monomer or water from an acrylonitrile polymer melt prepared by employing the monomer or water as a plasticizer, and maintaining at a temperature of at least 120° C. and a pressure which is at least equal to its autogenous pressure.

2. Description of the Prior Art

An acrylonitrile (or AN) polymer is generally difficult to melt by heat, since its melting point is higher than its pyrolysis temperature. It is, however, known that the treatment of an AN polymer at an elevated temperature and an elevated pressure in the presence of a small amount of a specific non-solvent gives a melt which is composed of uniform phases of the polymer and non-solvent, and which exhibits fluidity comparable to that of a polyester or polyamide melt. There have been proposed a number of processes for forming fibers, etc. from such a melt, as disclosed in, for example, U.S. Pat. No. 3,388,202, or Japanese Patent Application KOKAI No. Sho 48-28982, Sho 48-49839 or Sho 48-52832. Many of these processes are significantly characterized by employing water as the non-solvent for the AN polymer, instead of any conventional expensive solvent, such as dimethylformamide, dimethylsulfoxide, an aqueous rhodanate solution, or concentrated nitric acid, in the manufacture of a molded product of the polymer.

There have also been proposed a number of processes which employ the melting behavior of an AN polymer as described above in a system for polymerization to perform both the polymerization of an AN monomer and the manufacture of an AN polymer melt simultaneously, as disclosed in, for example, Japanese Patent Application KOKAI No. Sho 50-97683, Sho 54-30281, Sho 54-23724 or Sho 54-93122. These processes have drawn a great deal of attention, since they are considered to enable a shortening in the cycle of operation and a reduction in the cost of manufacture and the consumption of energy in the manufacture of films, fibers and other molded products of plastics.

The product as molded, however, contains an unreacted AN monomer, or mixture consisting mainly of an AN monomer if the preparation of an AN polymer and a melt thereof is carried out simultaneously, as mentioned above, or if an AN monomer is used as a plasticizer, as described in Japanese Patent Application KOKAI No. Sho 51-101061. It is, however, strictly required that the final product not contain any AN monomer, since it is toxic. Therefore, it is necessary to remove any AN monomer, or mixture from a molded product, e.g. fibers, by dip washing in cold or hot water for along time. With an increase in the operating speed of an overall production line, it is necessary to gain time for the complete removal of the monomer by employing a horizontally long apparatus, or an apparatus composed of a plurality of vertical portions juxtaposed one after another. The use of any such apparatus calls for a large space for installation, and gives rise to a reduction in operational simplicity, leading to an increase in the cost of manufacture and a lowering of productivity. In view of the problems and disadvantages which the removal of any AN monomer, or mixture from a molded product involves from the standpoints of apparatus and operation, it is desirable for the better industrial use of any AN polymer melt to remove any AN monomer, or mixture from the melt prior to molding.

According to, for example, Japanese Patent Application KOKAI No. Sho 54-30281, a temperature which is approximately equal to, or above 120°, and a pressure which is approximately equal to, or above the autogenous pressure of an AN polymer are employed to melt it in the presence of water, and it is, therefore, necessary to maintain the temperature and pressure prevailing in a vessel containing the molten polymer when removing any monomer from the polymer. If evaporation at a reduced pressure is employed for removing the monomer as is often the case, a temperature drop occurs from the removal by evaporation of water and/or an AN monomer, or mixture serving as a plasticizer from the molten AN polymer with violent boiling, and prevents the molten polymer from maintaining a temperature which is at least equal to its melting point, resulting in the partial or complete solidification thereof and the failure to obtain any uniformly melted and fluid polymer. Thus, it has still been impossible to obtain any AN polymer melt not containing any monomer.

SUMMARY OF THE INVENTION

Under these circumstances, it is an object of this invention to provide a method which facilitates the removal of any AN monomer from an AN polymer melt to enable the manufacture of a molded product of the AN polymer not containing any AN monomer, or mixture thereof.

It is a more specific object of this invention to provide a method of removing any AN monomer and/or water from an AN polymer at the elevated temperature and pressure at which the polymer remains as a melt with such water and/or monomer.

As a result of our hard research work, we, the inventors of this invention, have found that any evaporated monomer in a gas phase in a vessel containing a molten polymer can easily be removed from the vessel if saturated or superheated steam, or an inert gas, or a combination thereof is introduced into the gas phase, while the temperature and pressure prevailing in the vessel are maintained.

This invention is, thus, defined as a process for manufacturing an AN polymer melt which comprises introducing a gaseous medium selected from among saturated or superheated steam and an inert gas into a gas phase in a vessel holding an AN polymer melt formed from an AN monomer, or a monomer mixture consisting mainly of an AN monomer and containing at least one different unsaturated ethylene compound, maintain at a temperature of at least 120° C. and a pressure at least equal to its autogenous pressure, and containing water and a mainly AN monomer as a plasticizer, while maintaining the above temperature and pressure in the vessel, whereby the monomer and/or water is removed by replacement from the melt.

The vessel is preferably so sized that the area of the surface in which the melt contacts the gas phase, $S_L$ (m$^2$), the liquid phase volume of the melt, VL (m$^3$) may have a ratio ($S_L/V_L$), α of at least 10.

The melt manufactured by the process of this invention not only makes it possible to shorten or even eliminate the time-consuming step which has hitherto had to be taken for removing any monomer from a molded product by dip washing in cold or hot water, but also enables a safe product not containing any monomer to be manufactured at a lower cost. This invention can not only remove any monomer from a melt, but also make a melt having a controlled polymer content. The melt according to this invention can be shaped into a variety of kinds of molded products, such as fibers, films and sheets, if an appropriate molding process is employed.

Other features and advantages of this invention will become apparent from the following description and the accompanying drawings.

DETAILED DESCRIPTION OF THE INVENTION

The term "monomer" as herein used means an AN monomer, or a monomer mixture consisting mainly of an AN monomer, and also containing at least one different unsaturated ethylene compound. The unsaturated compound may be a known one which is copolymerizable with AN, and examples thereof are vinyl or vinylidene halides, such as vinyl chloride, bromide or fluoride, or vinylidene chloride; unsaturated carboxylic acids, such as acrylic, methacrylic, maleic or iraconic acid, or salts thereof; acrylic esters, such as methyl, ethyl, butyl, octyl, methoxyethyl, phenol or cyclohexyl acrylate; methacrylic esters, such as methyl, ethyl, butyl, octyl, phenyl or cyclohexyl methacrylate; unsaturated ketones, such as methyl vinyl ketone, phenyl vinyl ketone, methyl isobutenyl ketone or methyl isopropenyl ketone; vinyl esters, such as vinyl formate, acetate, propionate, butyrate or benzoate; vinyl ethers, such as methyl vinyl ether or ethyl vinyl ether; acrylamides, or alkyl-substituted products thereof; unsaturated sulfonic acids, such as vinylsulfonic, allylsulfonic, methallylsulfonic or styrenesulfonic acid, or salts thereof; styrenes, or alkyl- or halogen-substituted products thereof, such as methylstyrene or chlorostyrene; allyl alcohol, or esters or ethers thereof; basic vinyl compounds, such as vinylpyridine, vinylimidazole or dimethylaminoethyl methacrylate; unsaturated aldehydes, such as acrolein or methacrolein; unsaturated nitriles, such as methacrylonitrile or vinylidene cyanide; and crosslinking vinyl compounds, such as glycidyl methacrylate, N-methylolacrylamide, hydroxyethyl methacrylate, divinylbenzene or ethylene glycol diacrylate.

The monomer which is removed in accordance with this invention is mainly one employed for polymerization, but remaining unreacted in an AN polymer melt. This invention is, however, also applicable to the removal of any AN monomer added to a monomer-free AN polymer melt, and used as a plasticizer. This invention is, thus, not limited by the cause for which the monomer exists in the melt. Although this invention does not impose any particular limitation on the concentration of the AN monomer in an AN polymer melt, the melt may usually contain about 0.1 to 20% by weight of monomer if the monomer is an unreacted residue of polymerization.

Figure 1:
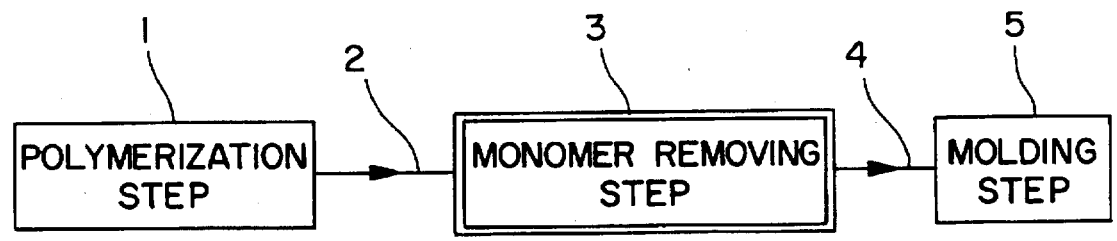
FIG. 1 is a diagram showing a step for monomer removal in relation to other steps.

FIG. 1 is a flowchart showing by way of example basic steps in a process which employs this invention for manufacturing a molded product of an AN polymer. The process includes a polymerization step 1 which may be carried out continuously or batchwise at a temperature of at least 120° C. and a pressure which is at least equal to the autogenous pressure of the polymer. A monomer removing step 3 connected to the step 1 by a connecting pipeline 2 may likewise be carried out continuously or batchwise, depending on the system employed by the polymerization step 1. The monomer removing step 3 employs a temperature which is approximately equal to that employed by the polymerization step 1, and a pressure which is at least equal to the autogenous pressure of a melt after consideration is given to any reduction caused by the resistance exerted by the equipment and pipeline on the melt passing therethrough. The AN polymer melt from which the monomer has been removed is transferred through a connecting pipeline 4 to a molding step 5 by which it is molded into an appropriately shaped product not containing any AN monomer, or mixture thereof.

Figure 2:
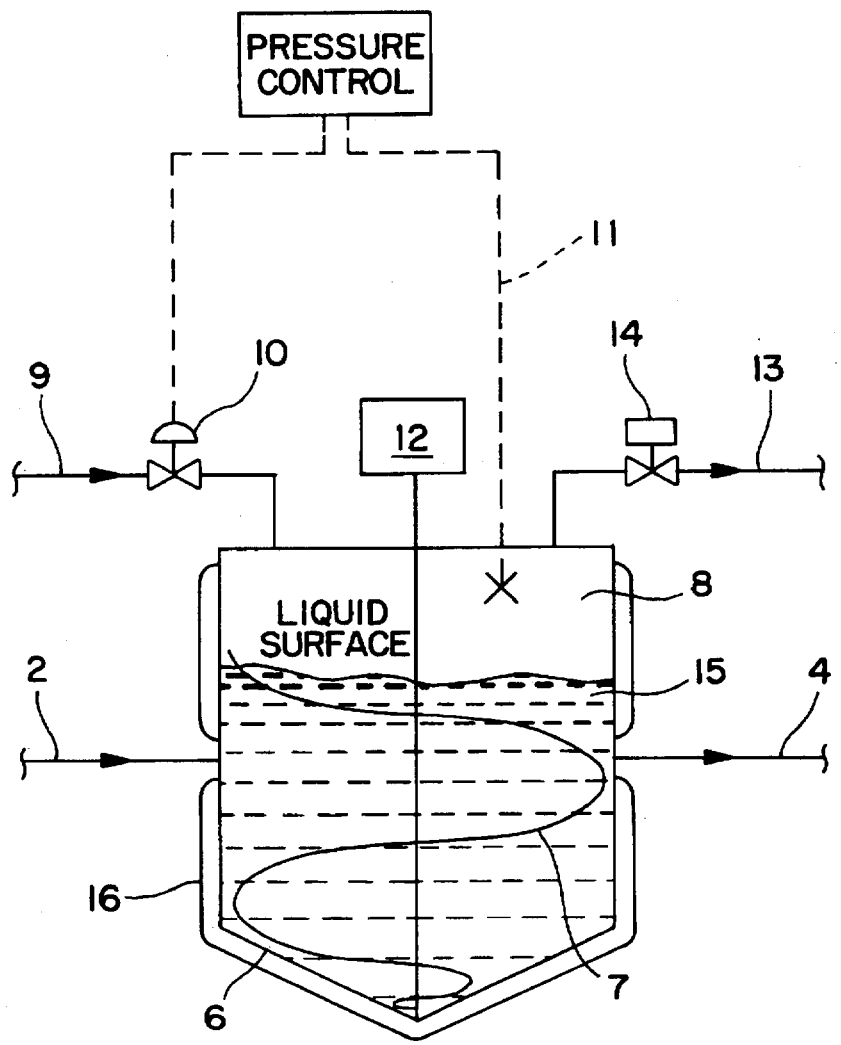
FIG. 2 is a diagram outlining the process of this invention.

FIG. 2 shows an apparatus for removing a monomer in a process embodying this invention. The apparatus comprises a vessel 6 which is fed through a connecting pipeline 2 with an AN polymer melt containing an AN monomer, or mixture thereof. The vessel 6 is so constructed as to withstand the temperature and pressure of the melt, and is equipped with a heater 16 which can control the melt in the vessel 6 to an appropriate temperature. The vessel 6 has in its interior a liquid phase 15 formed by the melt and a gas phase 8. The gas and liquid phases 8 and 15 have therebetween a boundary from which the AN monomer, or mixture is evaporated into the gas phase 8. A pipeline 9 is connected to the gas phase 8 in the vessel 6 for supplying it with a gaseous medium selected from among saturated or superheated steam, an inert gas, or a selected combination thereof. A heater is preferably provided immediately before an inlet for the gaseous medium to the vessel in the event that a gaseous medium not heated is supplied into the vessel.

The pipeline 9 is provided immediately before the inlet for the gaseous medium to the vessel 6 with an automatic pressure control valve 10 which responds to an output signal from a control loop 11 to detect the pressure of the gas phase 8 and control it to an appropriate level. The evaporated AN monomer, or mixture is discharged from the vessel 6 through a discharge pipeline 13 provided with an automatic valve 14. The melt in the vessel 6 is constantly stirred by a stirring blade 7 driven by a motor 12, so that the liquid surface between the gas and liquid phases 8 and 15 may constantly be renewed to promote the evaporation of the AN monomer, or mixture thereof.

The valve 14 in the pipeline 13 is kept in a somewhat open position, so that an output signal indicating a drop in pressure of the gas phase 8 may be transmitted to the valve 10 in the pipeline 9 to control the pressure of the gas phase 8. Alternatively, the valve 10 is kept in a somewhat open position, so that an output signal from the control loop 11 may be transmitted to the valve 14 for pressure control purposes.

The vessel may be of any shape or type if it can hold a melt having an elevated temperature and an elevated pressure and can form a gas phase fed with saturated or superheated steam, or an inert gas, or a combination thereof. Although the vessel has been shown as comprising a vertical tank having a stirring blade, it may alternatively comprise a horizontal tank, or an extruder or kneader having a screw shaft.

Although the removal of the monomer has been described, it is needless to say that, if the melt contains water as a plasticizer, such water is also removed. Thus, the amounts of the monomer and water in the liquid phase, or melt are reduced. Although the amount of water in the liquid phase may not always be reduced, depending on the gaseous medium which is introduced into the vessel, as when steam is used, the amount of the monomer is always reduced, so that it may eventually be possible to obtain a molded product not containing any monomer that is toxic. The vessel is preferably so sized as to enable a liquid surface to volume ratio, $\alpha$ of at least 10 to achieve a still higher efficiency of monomer removal, or remove a still larger amount of monomer per unit time. Although a greater value of $\alpha$ enables a higher efficiency of monomer removal, the equipment becomes too complicated and expensive to be practically acceptable, and a practically recommendable range of $\alpha$ is from 100 to 1,000, unless there is any other limiting factor. If $\alpha$ is less than 10, the efficiency of monomer removal is undesirably low, and probably because the melt stays at an elevated temperature and an elevated pressure for too long a time, a product molded from the melt is likely to be undesirably colored, or have an undesirably lower molecular weight.

The process of this invention will now be described more specifically by way of examples, in which a small batch type apparatus was employed, and which are not intended for limiting the scope of this invention.

EXAMPLE 1

Figure 3:
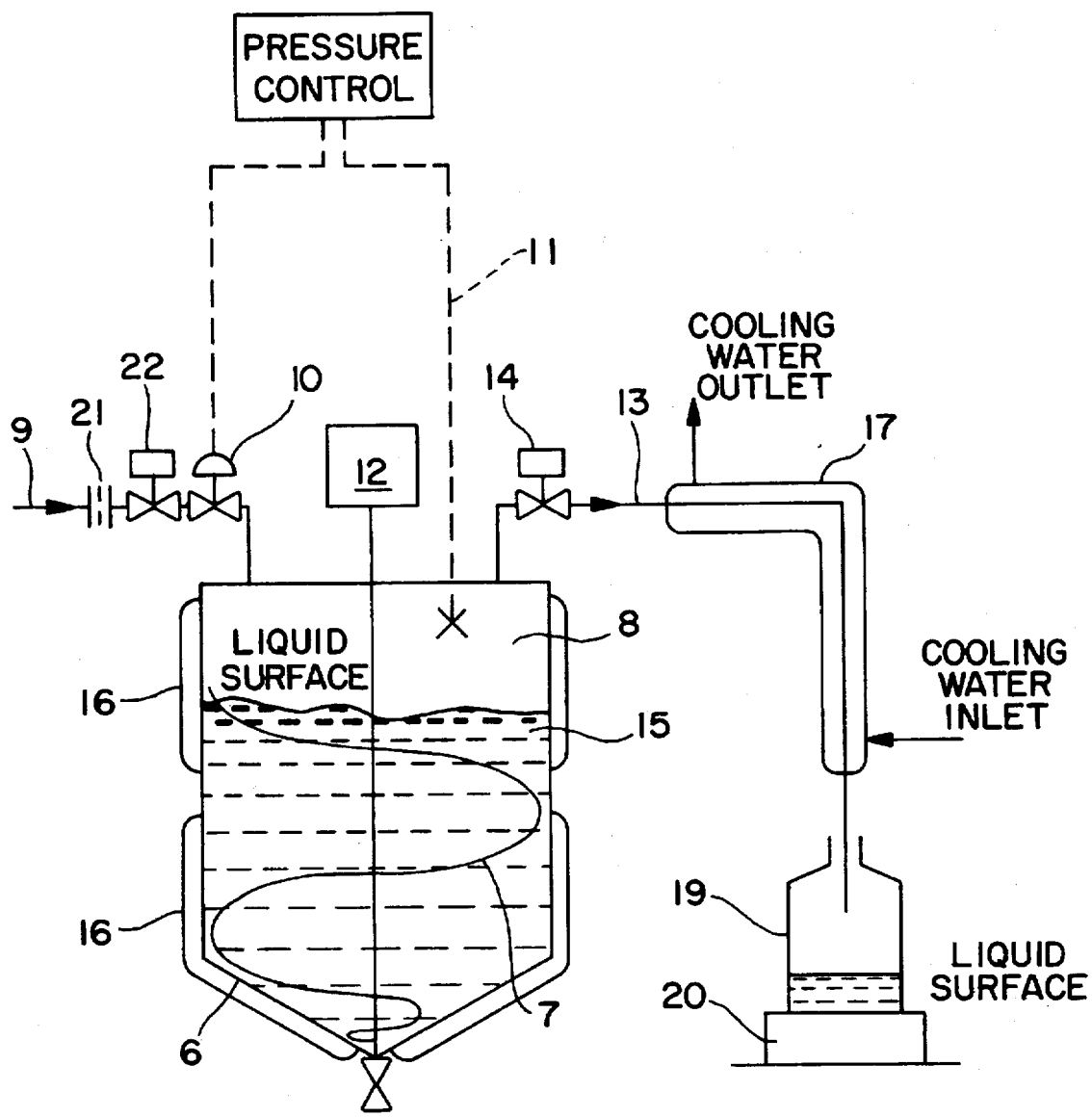
FIG. 3 is a diagram showing one embodiment of this invention.

A melt comprising 50% by weight of an AN homopolymer, 45% by weight of water and 5% by weight of an AN monomer and having a weight of 2 kg was held at a temperature of 175° C. and an absolute pressure of 9.0 kg/cm$^2$ in a vessel 6 having a capacity of 3 liters and equipped with a helical ribbon type stirring blade 7, as shown in FIG. 3. An automatic valve 22 in a pipeline 9 was opened and an automatic pressure control valve 10 was actuated, while an automatic valve 14 in a pipeline 13 was opened, and the introduction of saturated steam having an absolute pressure of 9.1 kg/cm$^2$ was started into the gas phase 8 in the vessel 6, while the pressure in the vessel 6 was maintained. A flow meter 21 indicated about 2 kg per hour. The evaporated AN monomer and steam were discharged from the gas phase 8 through the discharge pipeline 13, were condensed by a condenser 17 attached to the pipeline 13, and were collected in a sampling bottle 19.

After 90 minutes, the valves 14 and 22 were closed to discontinue the introduction of saturated steam into the vessel 6, while the pressure in the vessel 6 was maintained. The temperature of the vessel 6 was allowed to drop substantially to room temperature, and when the internal pressure of the vessel 6 had dropped substantially to atmospheric pressure, the vessel 6 was opened, and a water containing solid polymer was collected from the wall of the vessel 6 and the stirring blade 7 and weighed 1,125 g, while water separated completely from the solid polymer weighed 650 g, and the condensate was collected from the sampling bottle 19.

A weighing device 20 indicated a digital value of 2,900 g as the total weight of the condensed AN monomer and water, and the weight of the condensed AN monomer was 99 g as calculated from the AN content of the condensate. As no AN was found in the solid polymer and water collected from the vessel 6, 1 g of AN monomer, i.e. its starting weight of 100 g less its condensed weight of 99 g, was considered to have scattered from the sampling bottle 19, and at any rate, there was obtained a solid polymer (molded product) not containing any AN monomer. This fact confirms that there had been obtained a melt not containing any AN monomer before the vessel 6 was opened, or cooled. It can be concluded that about 20% by weight of water combined with 80% by weight of polymer to form an AN melt, while the remaining water did not contribute to forming the melt, but stayed in the vessel 6 as it was.

EXAMPLE 2

EXAMPLE 1 was repeated, except that nitrogen (inert gas) heated to 175° C. was introduced through the pipeline 9 at a rate of 240 liters per hour. The weighing device 20 indicated a digital value of 700 g and the weight of the condensed AN monomer was 99 g as calculated from the AN content of the condensate. Thus, substantially the same efficiency of monomer removal could be achieved in EXAMPLES 1 and 2.

When the vessel was opened, 1,175 g of a water containing solid polymer not containing any AN could be collected from the wall of the vessel 6 and the stirring blade 7, while no water separated completely from the solid polymer could be collected, as opposed to EXAMPLE 1.

Not only the AN monomer, but also water could be removed from the vessel, since nitrogen was employed as the gaseous medium for removing the monomer by replacement, while water could not be removed in EXAMPLE 1 in which saturated steam was employed. These results confirm that if e.g. nitrogen is employed as the gaseous medium for removing the monomer, it is also possible to reduce the amount of water employed as a plasticizer and control the ratio of polymer to water to form a melt having a high polymer concentration.

EXAMPLE 3

EXAMPLE 1 was repeated, except that superheated steam (obtained by heating to 175° C. saturated steam having an absolute pressure of 3.0 kg/cm$^2$ and a temperature of 133° C.) and nitrogen heated to 175° C. were introduced through the pipeline 9 at a rate of 1 kg per hour and 120 liters per hour, respectively. There were collected 1,140 g of a solid polymer from the wall of the vessel 6 and the stirring blade 7, 100 g of water separated completely from the solid polymer, and 1,900 g of condensate from the sampling bottle 19. No AN was found in the solid polymer or water.

EXAMPLE 4

Figure 4:
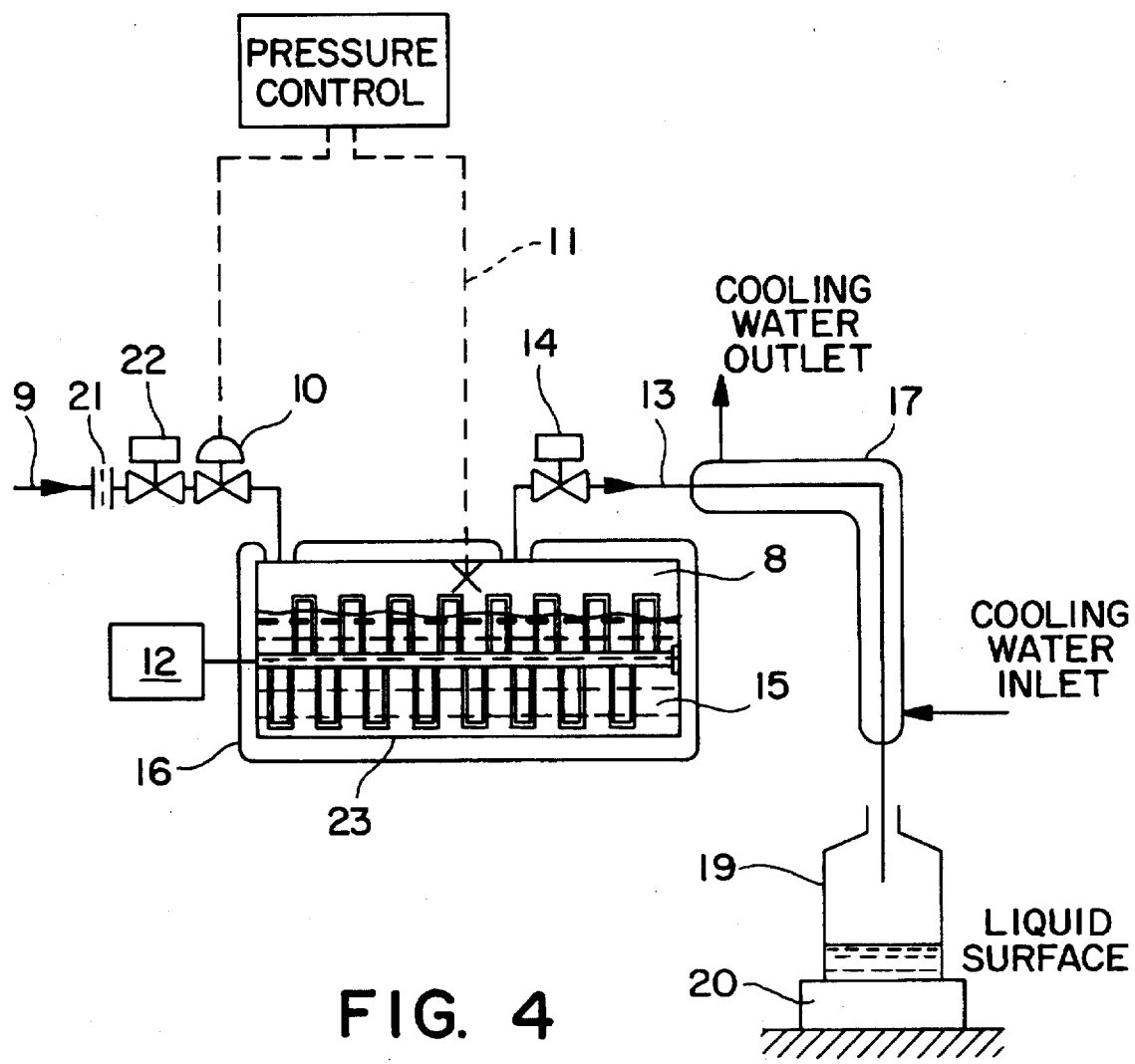
FIG. 4 is a diagram showing another embodiment of this invention.

EXAMPLE 1 was repeated, except that the vessel was changed to a horizontal twin-screw reactor 23 capable of forming a melt into thin film to achieve an improved result of surface renewal, as shown in FIG. 4, and that the introduction of saturated steam was continued for only 45 minutes.

Figure 5:
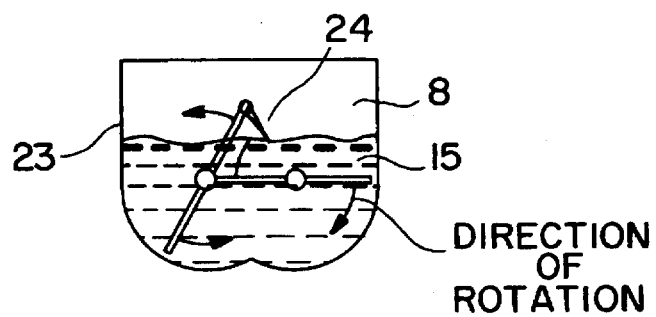
FIG. 5 is a cross sectional view of the vessel shown in FIG. 4.

FIG. 5 is a cross sectional view of the vessel 23. It had a gas phase 8 and a liquid phase 15 in its interior as the vessel employed in EXAMPLE 1 did, but the vessel 23 was equipped with a differently shaped stirring blade forming a thin film 24 of a melt in the boundary between the gas and liquid phases 8 and 15. The vessel was so sized as to enable an $\alpha$ value of 500.

The weighing device 20 indicated a digital value of 2,000 g as the total weight of the condensed AN monomer and water, and the weight of the condensed AN monomer was 99 g as calculated from the AN content of the condensate. No AN was found in a solid polymer collected from the wall of the vessel and the stirring blade, or in water separated completely from the solid polymer.

An improved efficiency of monomer removal per unit time could be achieved, insofar as no AN was found in the polymer despite the fact that the introduction of the gaseous medium for monomer removal had been continued for only a half of the time employed in EXAMPLE 1. This was apparently due to the surface area of the melt enlarged by its film and thereby increasing the evaporation of the monomer per unit time.

COMPARATIVE EXAMPLE 1

EXAMPLE 1 was repeated, except that no saturated steam was introduced into the vessel 6. Although the odor of the AN monomer rose from the vessel 6 as soon as it was opened, a solid polymer could be collected from the wall of the vessel 6 and the stirring blade 7, and water separated completely from the polymer, and the amount of the remaining AN monomer could be determined. The solid polymer contained 50 ppm by weight of AN monomer, while water contained 9% by weight of AN monomer. The polymer (or molded product) containing such a large amount of harmful substance was unsuitable for any practical use.

What is claimed is:

1. In a process for manufacturing an improved acrylonitrile polymer melt from a starting melt comprising the polymer, water and an acrylonitrile monomer, the melt having a temperature of at least 120° C. and a pressure at least equal to its autogenous pressure, and containing a plasticizer selected from the group consisting of a mainly acrylonitrile monomer and water, the improvement which comprises:

introducing a gaseous medium into a gas phase in a vessel holding said starting melt, said medium being selected from the group consisting of saturated steam, superheated steam and an inert gas, while maintaining said temperature of at least 120° C. and said pressure at least equal to the autogenous pressure of the melt in said vessel, whereby at least an unreacted acrylonitrile monomer is removed from said melt.

2. A process as set forth in claim 1, wherein said starting melt further contains at least one unsaturated ethylene compound.

3. A process as set forth in claim 1, wherein said water is also removed from said melt.

4. A process as set forth in claim 3, wherein said vessel is so sized that the ratio of the area of the surface in which said melt contacts said gas phase: the volume of said melt is at least 10.

5. A process as set forth in claim 2, wherein said water is also removed from said melt.

6. A process as set forth in claim 5, wherein said vessel is so sized that the ratio of the area of the surface in which said melt contacts said gas phase: the volume of said melt is at least 10.

* * * * *